(12) United States Patent
Ridgewell

(10) Patent No.: US 11,493,016 B2
(45) Date of Patent: Nov. 8, 2022

(54) WAVE ENERGY RECOVERY APPARATUS WITH POWER-TAKE-OFF ARRANGEMENT

(71) Applicant: AW-ENERGY OY, Vantaa (FI)

(72) Inventor: Christopher Ridgewell, Helsinki (FI)

(73) Assignee: AW-ENERGY OY, Vantaa (FI)

( * ) Notice: Subject to any disclaimer, the term of this patent is extended or adjusted under 35 U.S.C. 154(b) by 103 days.

(21) Appl. No.: 17/059,846

(22) PCT Filed: May 30, 2018

(86) PCT No.: PCT/FI2018/050407
§ 371 (c)(1),
(2) Date: Nov. 30, 2020

(87) PCT Pub. No.: WO2019/229290
PCT Pub. Date: Dec. 5, 2019

(65) Prior Publication Data
US 2021/0222666 A1  Jul. 22, 2021

(51) Int. Cl.
*F03B 13/18* (2006.01)

(52) U.S. Cl.
CPC .................. *F03B 13/182* (2013.01)

(58) Field of Classification Search
CPC .. F03B 13/182; F03B 13/264; F05B 2250/72; Y02E 10/30
See application file for complete search history.

(56) References Cited

U.S. PATENT DOCUMENTS

| | | | |
|---|---|---|---|
| 8,745,981 B1* | 6/2014 | Hanna | F03B 13/1855 60/507 |
| 9,551,125 B2* | 1/2017 | Koivusaari | E02B 9/08 |
| 2009/0072540 A1* | 3/2009 | McCague | F03B 13/186 290/53 |
| 2010/0187830 A1* | 7/2010 | Saavedra | F03D 5/06 290/55 |
| 2014/0145443 A1* | 5/2014 | Espedal | F03B 13/182 290/53 |
| 2017/0175700 A1* | 6/2017 | Pasanen | F03B 13/182 |

FOREIGN PATENT DOCUMENTS

| | | | |
|---|---|---|---|
| KR | 20-0400674 Y1 | 11/2005 | |
| WO | WO 2007/125307 A2 | 11/2007 | |
| WO | WO 2012/053899 A1 | 4/2012 | |
| WO | WO 2015/177400 A1 | 11/2015 | |
| WO | WO-2015177400 A1 * | 11/2015 | ............ F03B 13/182 |
| WO | WO 2017/062528 A2 | 4/2017 | |

* cited by examiner

*Primary Examiner* — Shafiq Mian
(74) *Attorney, Agent, or Firm* — Birch, Stewart, Kolasch & Birch, LLP

(57) ABSTRACT

This invention relates to a wave energy recovery apparatus with a power-take-off arrangement comprising at least a base, a reciprocating panel, two power-take-off (PTO) units with one or more generators to convert kinetic energy of waves or tidal currents to electricity, at least two gear transmissions operatively connected between the panel and the generators and at least two one-way clutch mechanisms to control the directions of rotation of the generators. The panel is arranged to rotate a half of the generators when rotating into one direction and another half of the generators when rotating into the opposite direction.

12 Claims, 8 Drawing Sheets

WAVE ENERGY RECOVERY APPARATUS WITH POWER-TAKE-OFF ARRANGEMENT

Figure 1:
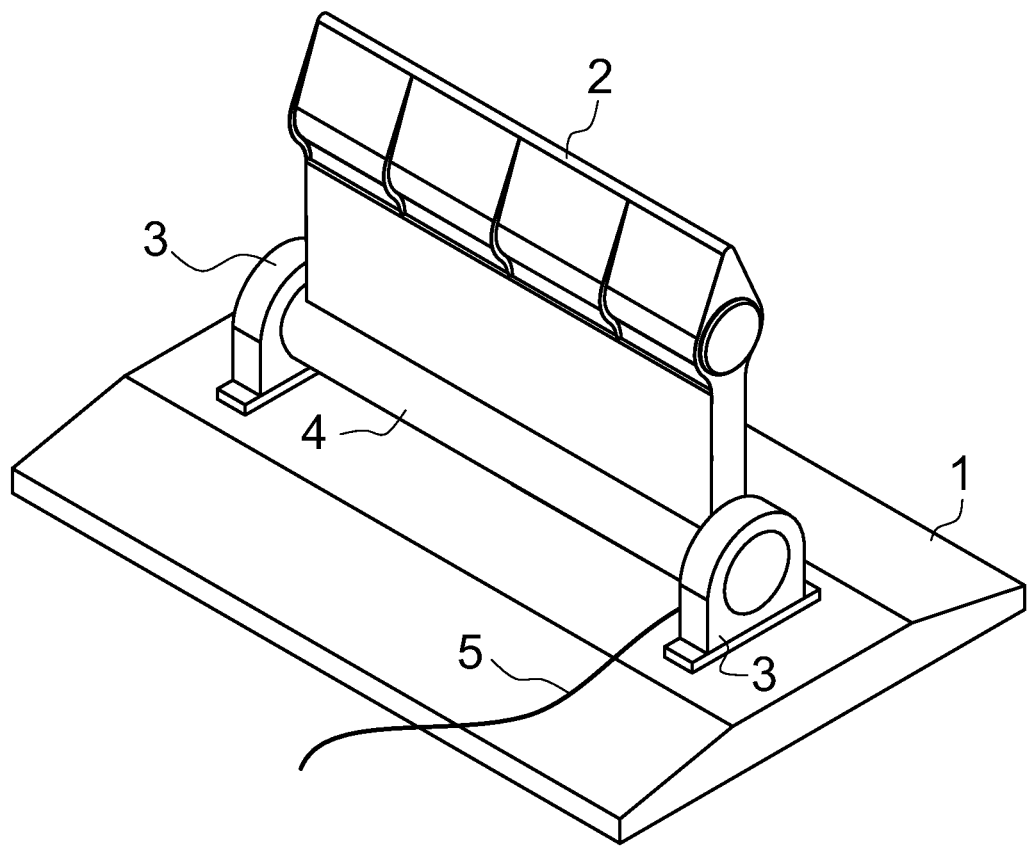

The present invention relates to a wave energy recovery apparatus with a power-take-off arrangement as defined in the preamble of claim 1.

The wave energy recovery apparatus according to the invention is suited very well for instance to be used in connection with panels or flaps or essentially plate-like wing elements, later called shorter only as panels, hinged with their lower edge to make a reciprocating movement caused by wave energy or tidal energy of seawater as shown for example in the U.S. Pat. No. 7,131,269 (B2). The wave energy or tidal energy collected is further converted underwater with a conversion unit for instance to electric energy. For the sake of simplicity, only the term wave energy is later mentioned when both the wave energy and the tidal energy of seawater are meant.

According to prior art there are various types of wave energy recovery systems where the arrangements include a base, and, for instance, one or more panels pivotally connected to the base to make a reciprocating or oscillating movement about a rotation axis or pivot axis in response to wave forces or tidal forces as shown for example in the U.S. Pat. No. 9,279,408 (B2) that presents, among other things, how to drive the wave energy conversion system. The oscillating movement is then converted for example to electric energy with the help of a power-take-off (PTO) unit equipped with a power-take-off (PTO) machinery comprising a generator or alike as shown for example in the Finnish patent No. FI119791B.

The PTO can also be placed inside the reciprocating structure of the wave energy recovery apparatus, for instance, inside the panel as shown for example in the US patent publication No. US2016040647 A1, or inside the tubular main shaft of the panel.

Commonly, in known wave energy converter systems it is difficult to efficiently transform the energy captured from the reciprocating movement of waves into electrical energy. For instance, the reciprocating movement of panels causes the rotors and axles of the electric generators to undergo a bi-directional rotational movement with a stop in connection with every reversing. As a consequence, the generators with components connected to them are prone to fatigue and further to breakages. In addition, controlling of the electric generators that make the reciprocating movement is complicated and difficult.

For that reason, there have been several attempts to transform the reciprocating movement of the movable element in a unidirectional movement of the rotor of the generator. For instance, international patent publications WO2006/118482 A1, WO2011/092555 A2 and WO2011/126451 A1 present different solutions to change the reciprocating movement caused by waves into a unidirectional movement of the rotor of the generator when recovering wave energy.

All these solutions of the WO publications mentioned above use at least two one-way clutches, freewheels or other anti-reverse mechanisms for each generator, which are continuously engaged and disengaged to ensure that the reciprocating movement caused by waves is changed to a unidirectional movement of the rotor of the generator. However, the continuous engagement and disengagement of the one-way clutches, freewheels or other anti-reverse mechanisms mentioned above cause mechanical wear and failures in the PTO systems. In addition, the PTO structures of the solutions of these WO publications are extremely complicated, which also cause the PTO structures to be prone to mechanical wear that reduces the lifetime of the solutions of these WO publications. Therefore, there is still a need for more efficient and/or more robust PTO systems.

The object of the present invention is to eliminate the drawbacks described above and to achieve a reliable, compact, economical and efficient wave energy recovery apparatus with an improved power-take-off (PTO) arrangement in order to be able to capture a maximum amount of available wave or tidal energy and which apparatus is easily controllable. Another object of the present invention is to make the installation, maintenance and repairs of the wave energy conversion apparatus easy and fast, and to make it possible to easily disconnect/connect the electric generators from/to the other structure without disturbing the functions of the other structure. Thus, for example one generator can be removed and replaced with another generator without disturbing the whole system. The wave energy recovery apparatus with a power-take-off arrangement according to the invention is characterized by what is presented in the characterization part of claim 1. Other embodiments of the invention are characterized by what is presented in the other claims.

An aspect of the invention is to provide a wave energy recovery apparatus with a power-take-off arrangement comprising at least a base, a reciprocating panel, two power-take-off (PTO) units with one or more generators to convert kinetic energy of waves or tidal currents to electricity, at least two gear transmissions and at least two one-way clutch mechanisms, all operatively connected between the panel and the generators. Advantageously, the panel is arranged to rotate a half of the generators when the panel is rotating into one direction and another half of the generators when the panel is rotating into the opposite direction. Advantageously, the direction of rotation of each generator is controlled with one one-way clutch mechanism, which one-way clutch mechanism is preferably arranged to allow the generator to have only one direction of rotation.

The solution of the invention has significant advantages over the solutions of the prior art. The number of relatively small PTO units and/or electric generators make it possible to place several PTO units and/or generators along the shaft of the reciprocating panel. This allows a torque induced stress range to be more evenly distributed along the panel thus reducing the peak stress range induced by the PTO torque and thus increasing the fatigue life of the panel. That also allows the reduction in the size of the PTO components and thus the reduction in costs. The small size of the PTO units and/or generators also makes it possible to incorporate the PTO units and/or generators into the panel. With the help of a one-way clutch, such as a sprag clutch, one or more generators can be arranged to rotate to one direction only and another one or more generators can be arranged to rotate to the opposite direction only. Thus, a first half of the generators rotates all the time in one direction, i.e. clockwise, and a second half of the generators rotates all the time in opposite direction, i.e. counter clockwise. Yet one advantage is that the arrangement comprises at least two PTO units with generators. In that case, the PTO units can be taken separately to service and changed if necessary. Yet one advantage is that the PTO units can be installed on both sides of the panel.

Figure 2:
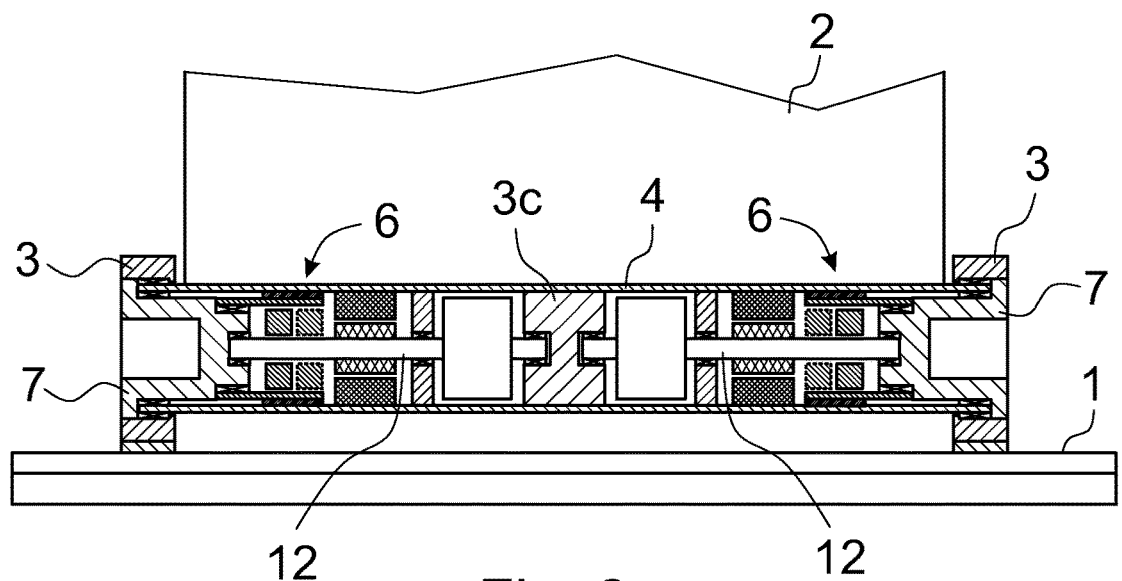
Figure 3:
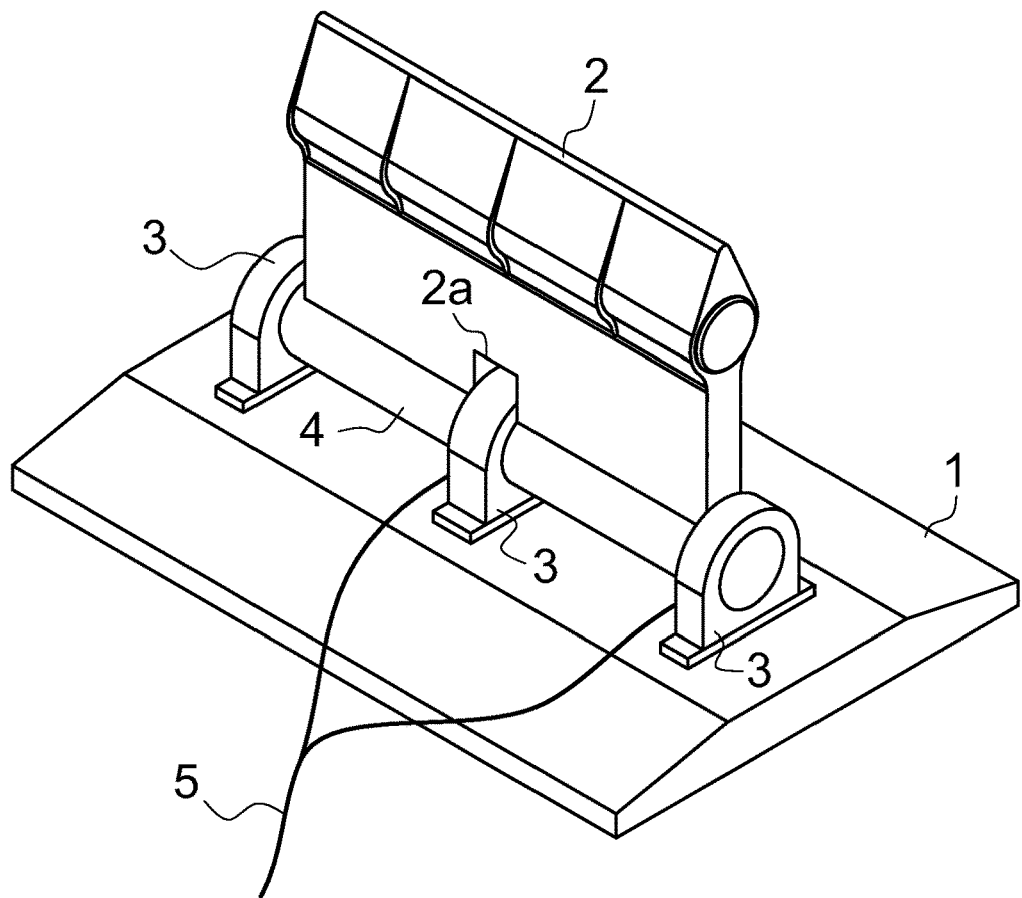
Figure 4:
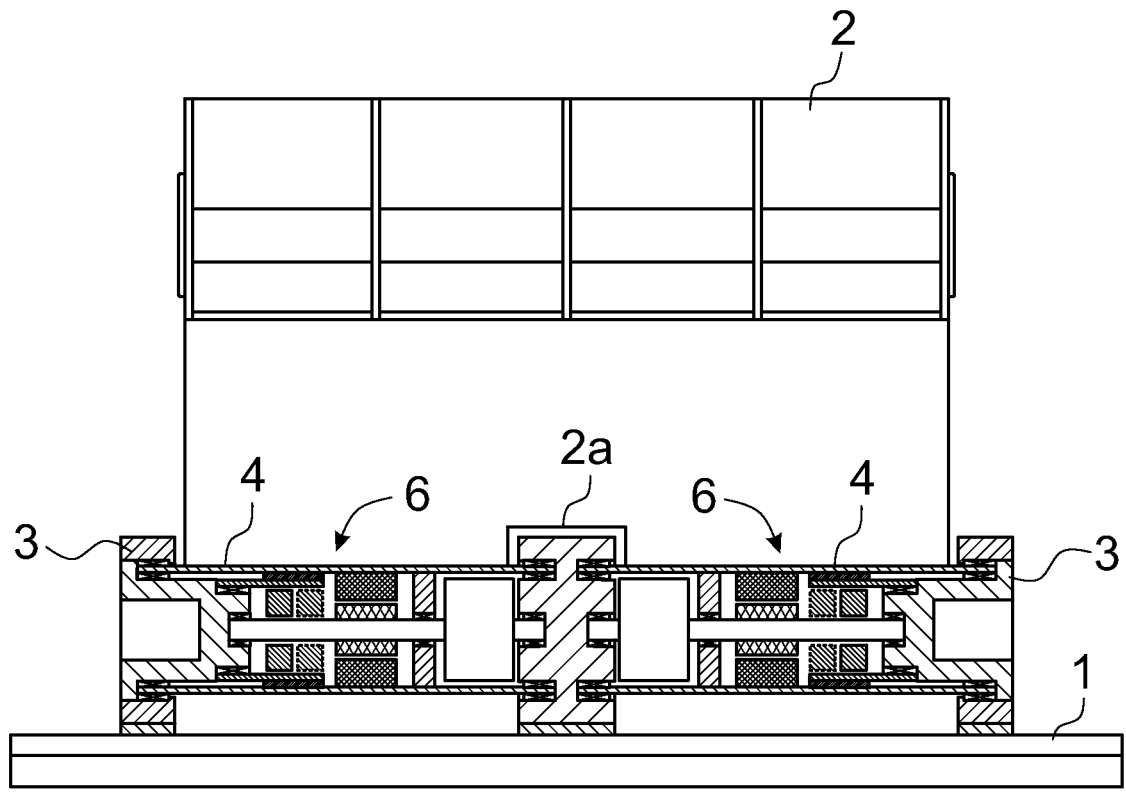
Figure 5:
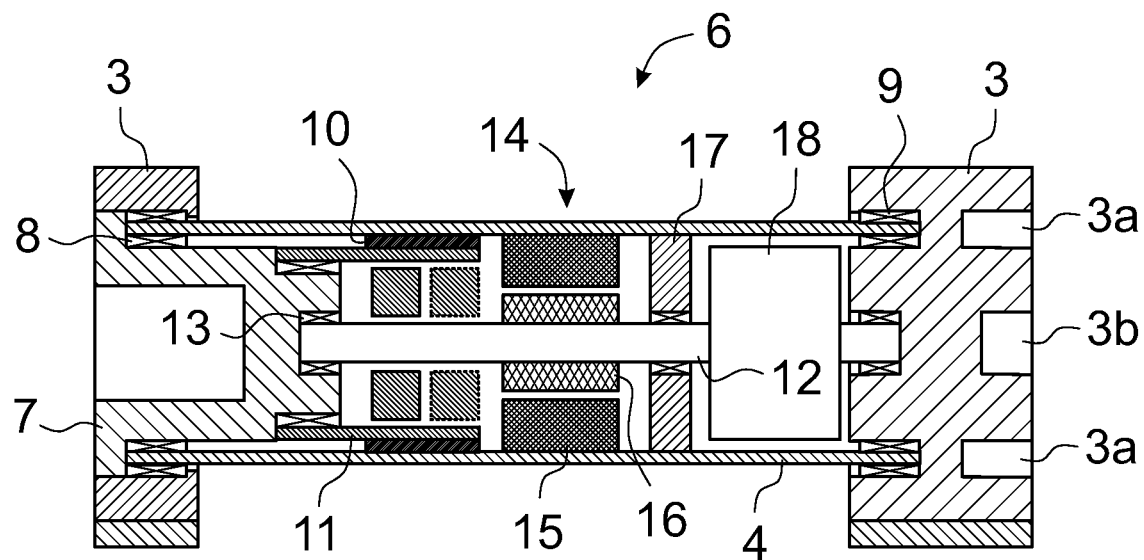
Figure 6:
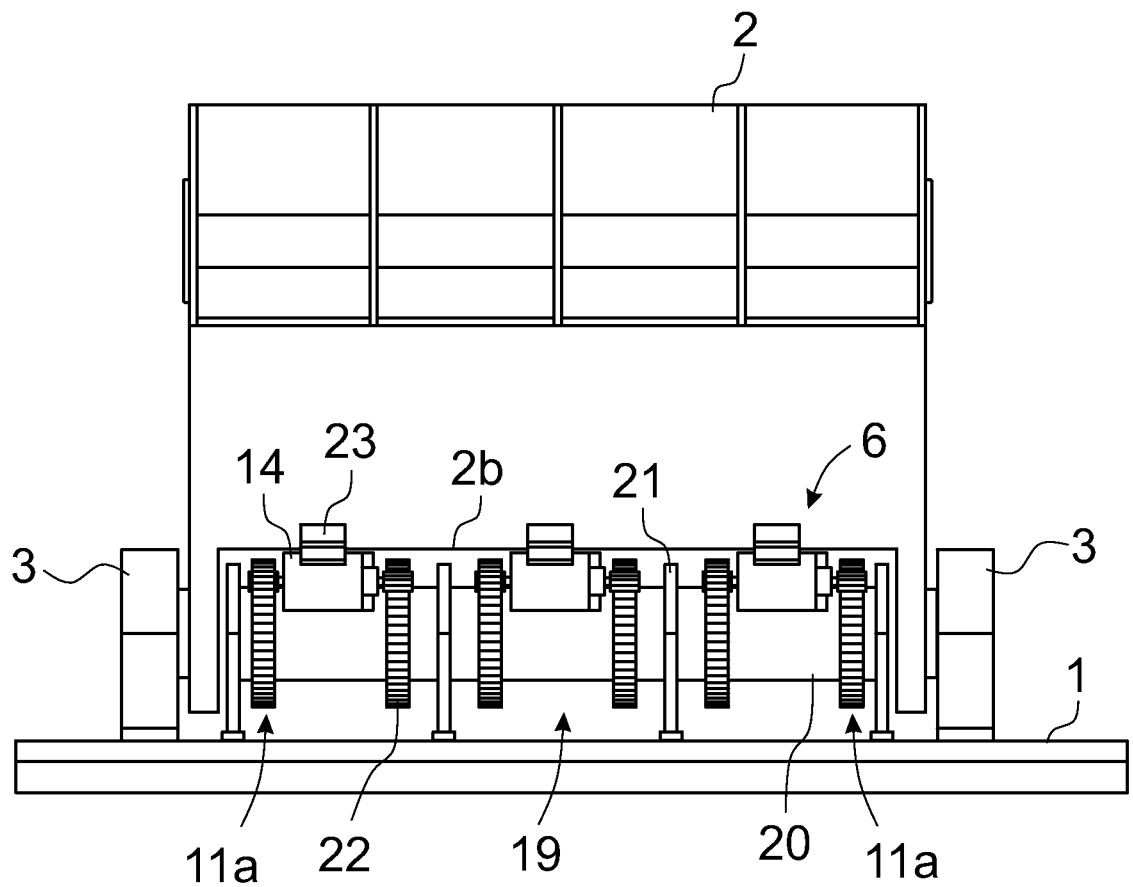
Figure 7:
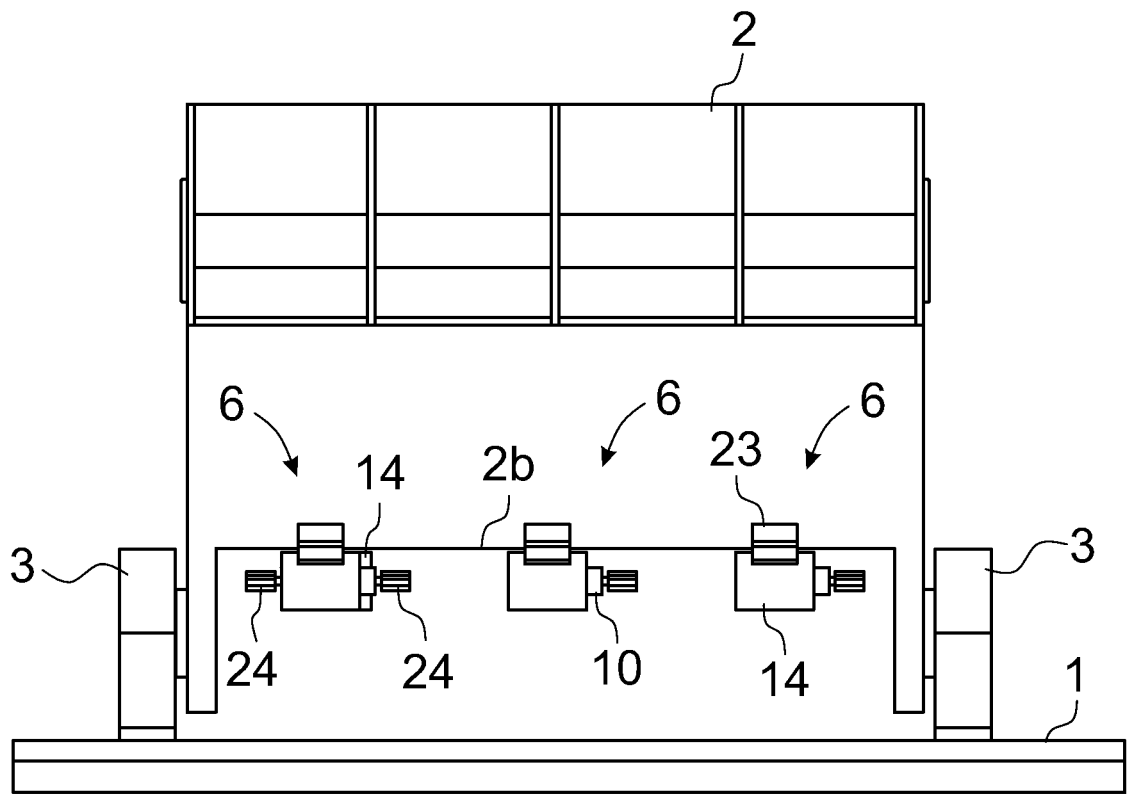
Figure 8:
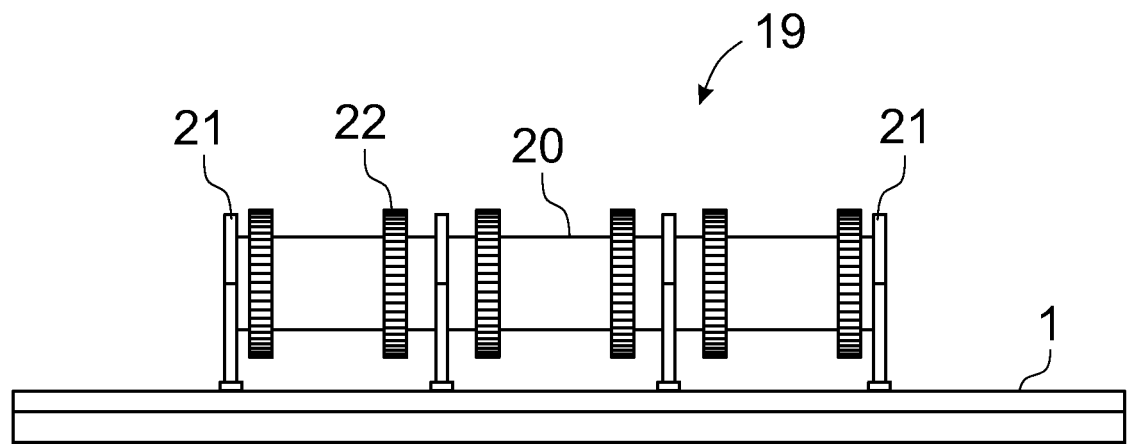
Figure 9:
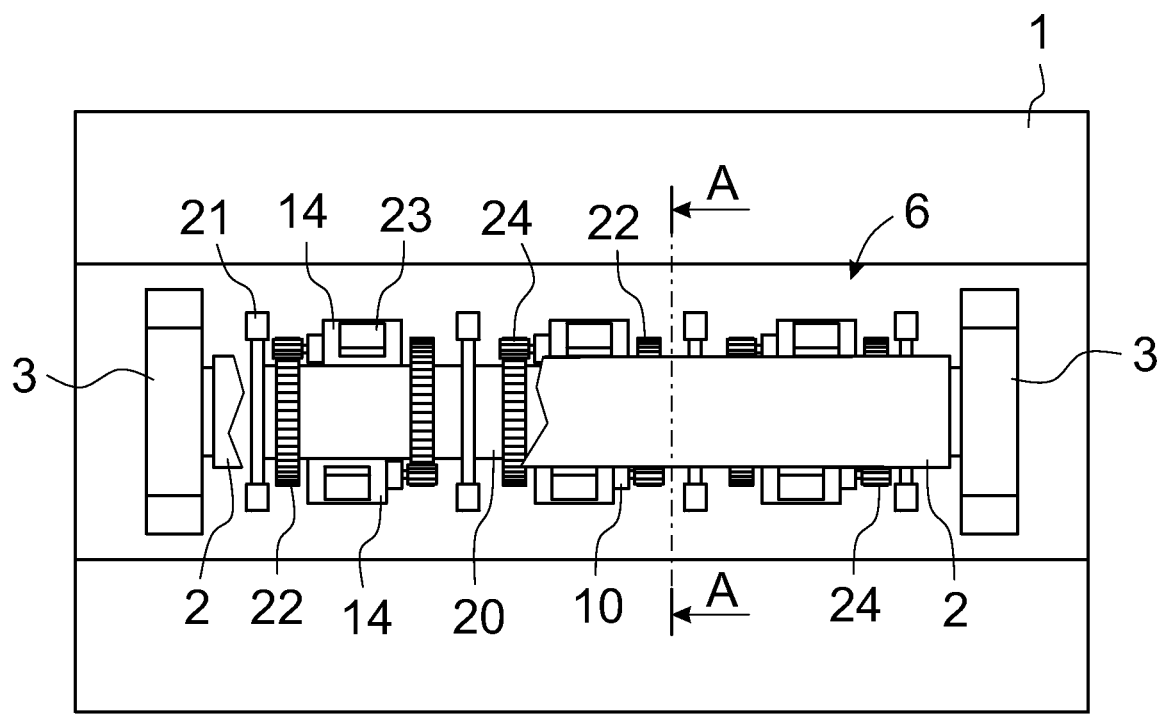
Figure 10:
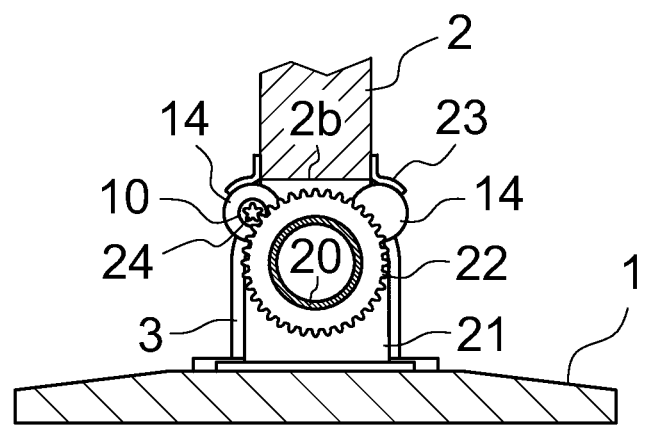
Figure 11:
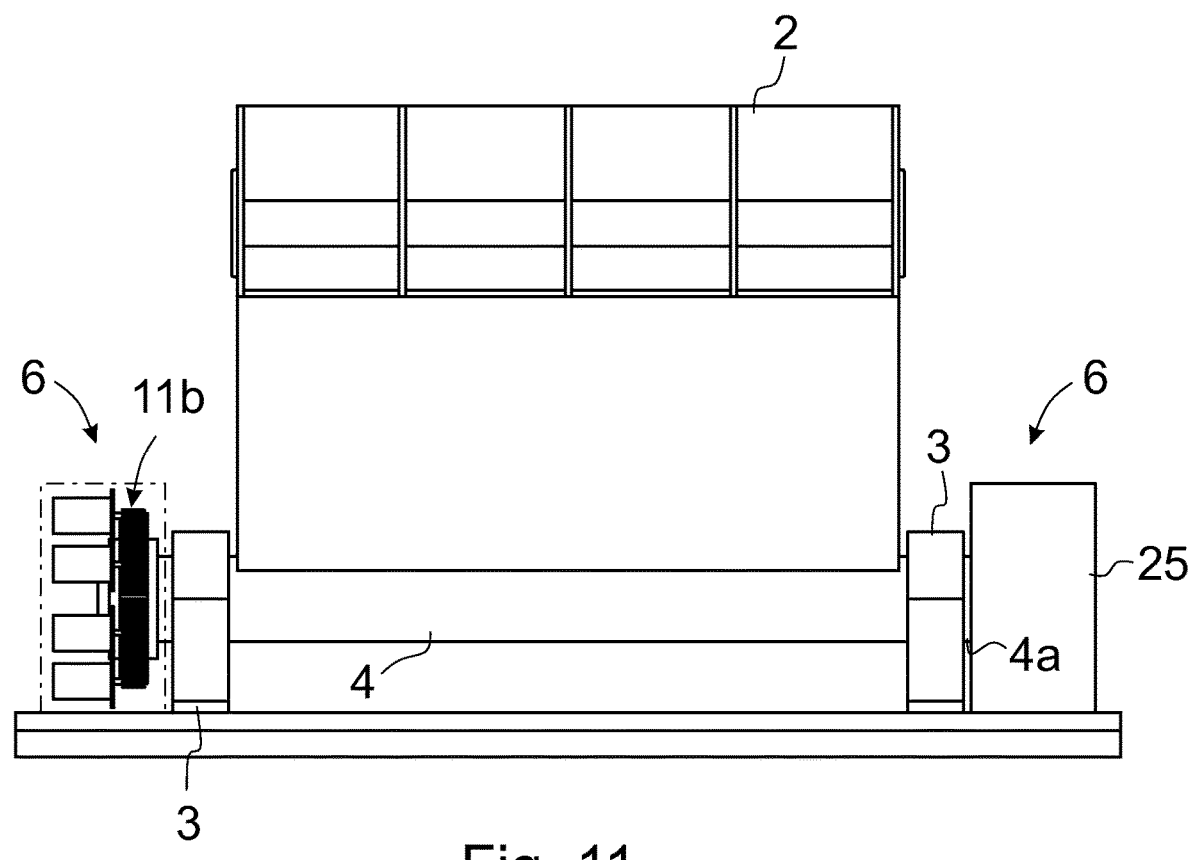
Figure 12:
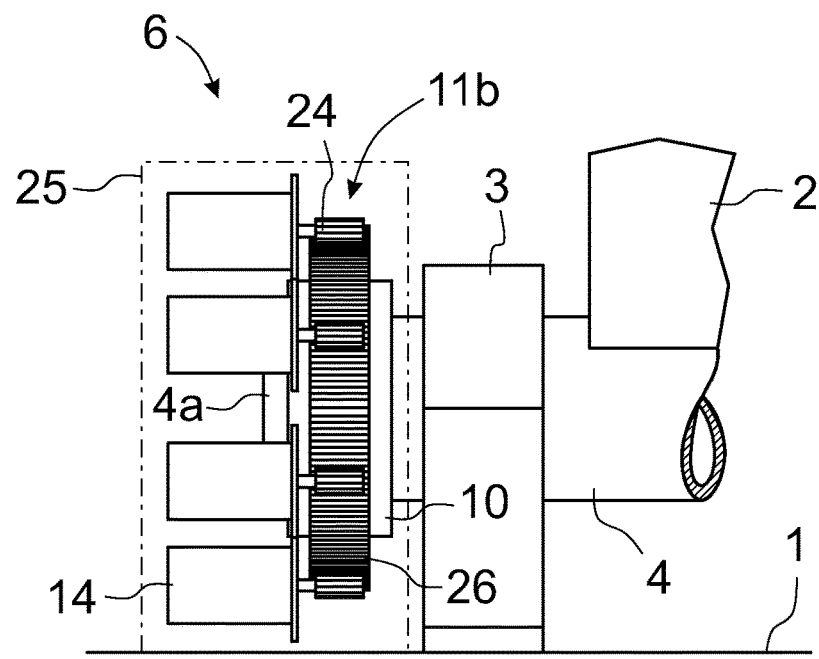
Figure 13:
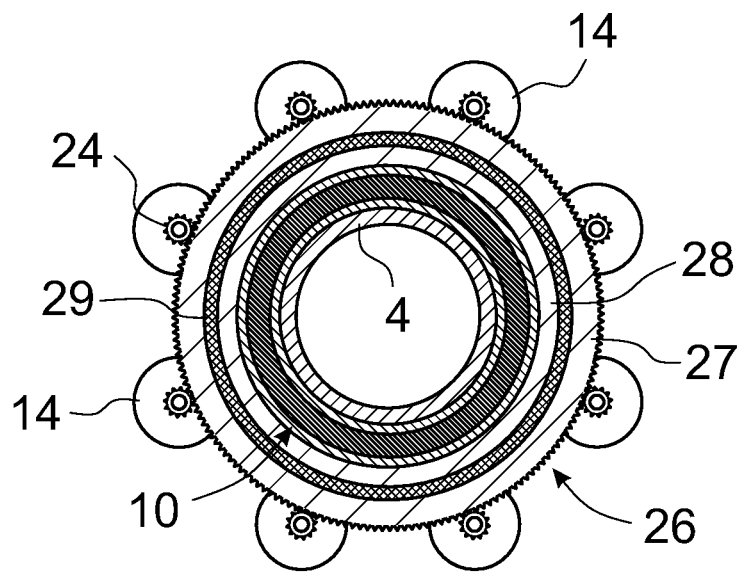
Figures 14, 15:
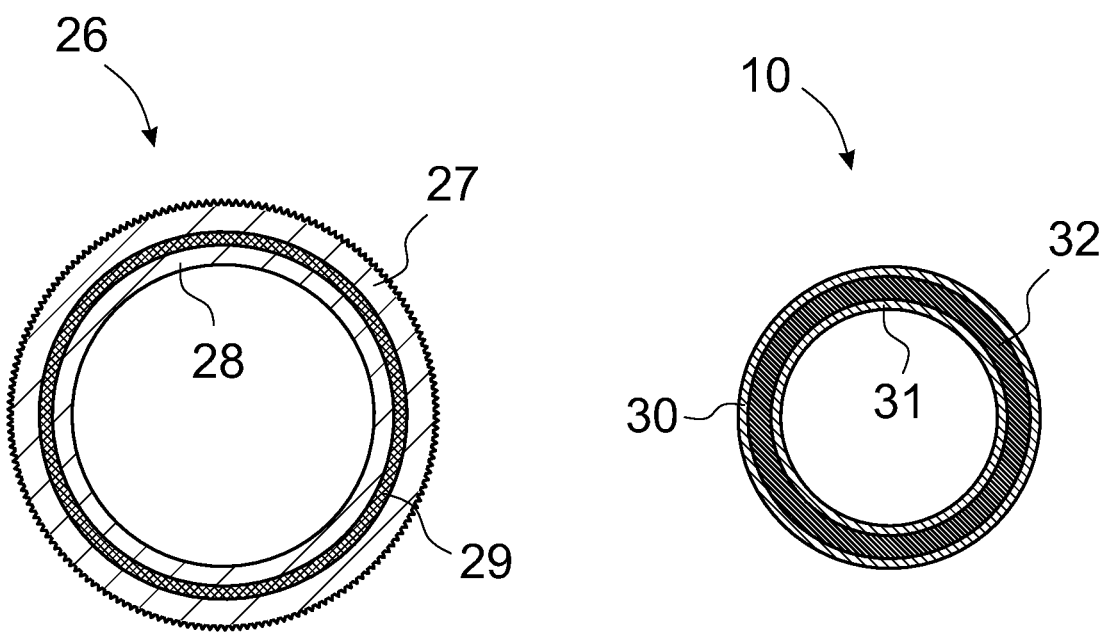

In the following, the invention will be described in detail by the aid of examples by referring to the attached simplified and diagrammatic drawings, wherein FIG. 1 presents a simplified oblique top view of a wave energy recovery apparatus according to the invention equipped with a reciprocating panel, FIG. 2 presents in a side view and in a simplified and diagrammatic way a lower part of the wave energy recovery apparatus according to FIG. 1 a tubular shaft of the panel cross-sectioned, FIG. 3 presents a simplified oblique top view of another wave energy recovery apparatus according to the invention, FIG. 4 presents in a side view and in a simplified and diagrammatic way a wave energy recovery apparatus according to FIG. 3 with the lower part, comprising a tubular shaft, cross-sectioned, FIG. 5 presents in a side view, enlarged and in a simplified and diagrammatic way and cross-sectioned a power take-off unit (PTO) which can be used in the wave energy recovery apparatus according to the invention, FIG. 6 presents in a side view and in a simplified and diagrammatic way yet another type of wave energy recovery apparatus according to the invention, FIG. 7 presents in a side view and in a simplified and diagrammatic way the reciprocating panel with generators of the arrangement according to FIG. 6, FIG. 8 presents in a side view and in a simplified and diagrammatic way the motionless lower part of the arrangement according to FIG. 6, FIG. 9 presents in a top view and in a simplified and diagrammatic way and partially cross-sectioned the wave recovery arrangement according to FIG. 6, FIG. 10 presents in a simplified and diagrammatic way the wave recovery arrangement according to FIG. 6 seen cross-sectioned along the line A-A in FIG. 9, FIG. 11 presents in a side view and in a simplified and diagrammatic way yet another type of wave energy recovery apparatus according to the invention, a protective housing removed from the first PTO unit, FIG. 12 presents in a side view, enlarged, in a simplified and diagrammatic way and a power take-off unit (PTO) of the wave energy recovery apparatus according to FIG. 11 without the protective housing, FIG. 13 presents in a front view and in a simplified and diagrammatic way and partially cross-sectioned the power take-off unit (PTO) of the wave energy recovery apparatus according to FIG. 11, FIG. 14 presents in a front view and in a simplified and diagrammatic way and a gear rim of the power take-off unit (PTO) of the wave energy recovery apparatus according to FIG. 11, and FIG. 15 presents in a front view and in a simplified and diagrammatic way and a one-way clutch mechanism of the power take-off unit (PTO) of the wave energy recovery apparatus according to FIG. 11.

The basic idea of the present invention is to achieve an arrangement, which comprises at least a reciprocating panel 2 hinged with its lower edge, and at least two power take-off (PTO) units 6 with their generators 14. Advantageously, the PTO units 6 or at least their generators 14 are relatively small. In addition, each generator 14 is arranged to rotate only to one direction, either clockwise or counterclockwise. Preferably, the arrangement comprises an even number of generators 14 of which a half rotates clockwise, and another half rotates counterclockwise when seen from the same direction. At minimum the arrangement comprises two generators 14 but the number of generators can be also bigger.

FIGS. 1-2 present a first advantageous embodiment of the wave energy recovery apparatus according to the invention.

In FIG. 1 the wave energy recovery apparatus according to the invention equipped with a hinged reciprocating panel 2 is presented in a simplified oblique top view, and in FIG. 2 the wave energy recovery apparatus according to FIG. 1 is presented in a side view and in a simplified and diagrammatic way with a tubular shaft 4 of the panel 2 cross-sectioned.

The wave energy recovery apparatus comprises at least a base 1, the hinged panel 2 reciprocating about the center axis of its pivot shaft that comprises a tubular shaft 4, fitted with bearings at both ends in bearing housings 3 that are fastened to the base 1. One bearing housing 3 is at each end of the panel 2. The power-take-off (PTO) units 6 are placed inside the tubular shaft 4, one at each end of the tubular shaft 4. Rotation axes 12 of the generators of the PTO units 6 are fitted with bearings between support elements 7 in the bearing housings 3 and an intermediate support 3c that is inside and in the middle of the tubular shaft 4. The first PTO unit 6 is fitted between the first support element 7 and the first side of the intermediate support 3c, and the second PTO unit 6 is fitted between the second support element 7 and the second side of the intermediate support 3c. The panel 2 is fastened to the tubular shaft 4. The reciprocating motion or shorter only the motion of the panel 2 and the tubular shaft 4 is a back and forth rotating motion around the center axis of the tubular shaft 4. Preferably, the rotation angle of the panel 2 is at maximum ±90° from the vertical position. A transmission line 5 is used to transmit the produced electricity to further use.

The reciprocating panel 2 oscillates on the base 1 back and forth with the movement of seawater for recovering kinetic energy like wave energy of seawater. The panel 2 and the tubular shaft 4 rotate back and forth together simultaneously and at the same speed of rotation. At the production site the base 1 is preferably mounted onto the bottom of the sea, but it can also be near the bottom supported by pillars.

FIGS. 3-4 present another advantageous embodiment of the wave energy recovery apparatus according to the invention. In FIG. 3 the wave energy recovery apparatus according to the invention is presented in a simplified oblique top view, and in FIG. 4 the wave energy recovery apparatus according to FIG. 3 is presented in a side view and in a simplified and diagrammatic way, and the lower part that comprises a tubular shaft 4 is cross-sectioned.

The wave energy recovery apparatus comprises at least a base 1, a hinged panel 2 reciprocating about the center axis of its pivot shaft that comprises two substantially coaxial tubular shafts 4, fitted with bearings at both ends in bearing housings 3 that are fastened to the base 1. The panel 2 is fastened to the tubular shafts 4. One bearing housing 3 is at each end of the panel 2 and the third bearing housing 3 is in the middle of the panel 2 where the panel 2 has a recess 2a for the bearing housing 3. The power-take-off (PTO) units 6 are placed inside the tubular shafts 4. The reciprocating motion or shorter only motion of the panel 2 and the tubular shafts 4 is a back and forth rotating motion around the center axis of the tubular shafts 4. A transmission line 5 is used to transmit the produced electricity to further use.

The reciprocating panel 2 oscillates on the base 1 back and forth with the movement of seawater for recovering kinetic energy like wave energy of seawater. The panel 2 and the tubular shafts 4 rotate back and forth together simultaneously and at the same speed of rotation. At the production site the base 1 is preferably mounted onto the bottom of the sea, but it can also be near the bottom supported by pillars.

The embodiments according to FIGS. 1-4 comprise two coaxial PTO units 6 that have been placed inside one tubular shaft 4 or two tubular shafts 4, one PTO unit 6 in each shaft 4. Advantageously, the number of PTO units 6 inside the tubular shafts 4 can be also bigger than two. Thus, the PTO units 6 can be inside their own tubular shafts 4 also 4, 6, 8, 10, 12 or even more but always an even number.

FIG. 5 presents in a side view, enlarged and in a simplified, diagrammatic and a more detailed way and cross-sectioned a power take-off unit or shorter PTO unit 6 that can be used in the wave energy recovery apparatus according to the invention. The same kind of PTO unit 6 can be used both the wave energy recovery apparatus according FIG. 1 or FIG. 3. Only the bearing arrangement between the two PTO units 6 differs depending on the case.

A support element 7 with a circular cross-section is fastened inside the first bearing housing 3 so that the support element 7 extends with smaller circular cross-sections towards the middlemost bearing housing 3 in the middle of the panel 2. Between the inner circumference of the bearing housing 3 and the outer circumference of the support element 7 there is an annular groove for a bearing 8 with which the tubular shaft 4 is fitted in the bearing housing 3 at its first end. Correspondingly, the middlemost bearing housing 3 of the embodiment of FIG. 3 has in its both sides an annular groove 3a for a bearing 9 with which the tubular shafts 4 are fitted in the middlemost bearing housing 3 at their second end. A rotation axle 12 of the generator 14 is fitted with bearings 13 at its both ends. At the first end of the axle 12 the bearing 13 is in its recess in the center of the support element 7 and at the second end of the axle 12 the bearing 13 is in its recess 3b in the center of the annular groove 3a for the bearing 9. Thus, all the bearings 8, 9 and 13 are coaxial.

On the first end of the rotation axle 12 there is a speed changing gear system, such as a gear transmission 11 to convert the slow motion of the panel 2 and tubular shaft 4 to a fast speed of rotation of the rotation axle 12. Preferably, the gear transmission 11 is a planetary transmission. The gear transmission 11 is coupled to the slowly reciprocating tubular shaft 4 through a one-way clutch mechanism 10 so that the rotation axle 12 rotates to one direction only, either clockwise or counterclockwise. In that case, the outer circumference of the one-way clutch mechanism 10 is fastened to the inner circumference of the tubular shaft 4 and the inner circumference of the one-way clutch mechanism 10 is fastened to the outer part of the gear transmission 11. Thus, the one-way clutch mechanism 10 is operatively connected between the tubular shaft 4 and the gear transmission 11, which gear transmission 11 is further operatively connected between the one-way clutch mechanism 10 and the rotation axle 12 of the generator 14.

On the middle part of the rotation axle 12 there is a rotor 16 of the generator 14. A stator 15 is axially at the same location and is fastened to the inner circumference of the tubular shaft 4. On the second end of the rotation axle 12 there is a flywheel 18 that is fastened to the rotation axle 12. Axially between the generator 14 and the flywheel 18 there is a support flange 17 that is fastened to the inner circumference of the tubular shaft 4. The support flange 17 has a bearing, preferably similar to the bearings 13 on which the rotation axle 12 is fitted.

As mentioned earlier the advantageous embodiments of the wave energy recovery apparatus according to the invention comprises two PTO units 6. For example, the embodiments of FIGS. 1 and 3 advantageously comprises comprise two PTO units 6. FIG. 5 presents the first PTO unit 6 of the two. The second PTO unit 6 is otherwise similar to the first one but the second one is like a mirror image and the generator 14 inside the tubular shaft 4 is arranged to rotate to the opposite direction compared to the generator 14 of the first PTO unit 6. In that case, the one-way clutch mechanism 10 of the second PTO unit 6 is arranged to work reversely compared to the one-way clutch mechanism 10 of the first PTO unit 6, when seen at the same direction.

Thus, when the rotational movement of the panel 2 and the tubular shaft 4 is towards the first direction, say clockwise, the one-way clutch mechanism 10 of the first PTO unit 6 is in the working mode and the gear transmission 11 of the first PTO unit 6 rotates its rotation axle 12 in the clockwise direction, whereas the one-way clutch mechanism 10 of the second PTO unit 6 is in the free mode and the gear transmission 11 of the second PTO unit 6 neither rotates nor decelerates its rotation axle 12. However, the rotation axle 12 of the second PTO unit 6 continues its rotation by the contribution of the flywheel 18.

And, when the panel 2 goes back and the rotational movement of the panel 2 and the tubular shaft 4 is towards the second direction, say counterclockwise, the one-way clutch mechanism 10 of the first PTO unit 6 is in the free mode and the gear transmission 11 of the first PTO unit 6 neither rotates nor decelerates its rotation axle 12. But also now, the rotation axle 12 of the first PTO unit 6 continues its rotation by the contribution of the flywheel 18. Whereas the one-way clutch mechanism 10 of the second PTO unit 6 is in the working mode and the gear transmission 11 of the second PTO unit 6 rotates its rotation axle 12 in the counterclockwise direction. And continuing so, the rotation axle 12 of the first PTO unit 6 rotates always clockwise and the rotation axle 12 of the second PTO unit 6 rotates always counterclockwise. The clockwise and counterclockwise directions are always seen from the same direction, for example from the first end of the panel 2.

When the apparatus comprises only two PTO units 6 the tubular shaft 4 can also be a continuous unbroken shaft with one PTO unit 6 at its both ends, as is presented in FIGS. 1 and 2. Then the middlemost bearing housing 3c is totally inside the tubular shaft 4 and rotates with the tubular shaft 4. When the apparatus comprises more than two PTO units 6 it is realistic that each PTO unit 6 is inside its own tubular shaft 4.

FIGS. 6-10 present a third advantageous embodiment of the wave energy recovery apparatus according to the invention. In FIG. 6 another type of an arrangement according to the invention is presented in a side view and in a simplified and diagrammatic way. FIG. 7 presents in a side view and in a simplified and diagrammatic way the reciprocating panel 2 with generators 14 according to the arrangement of FIG. 6. FIG. 8 presents in a side view and in a simplified and diagrammatic way the motionless lower part 19 of the arrangement according to FIG. 6, whereas FIG. 9 presents in a top view and in a simplified and diagrammatic way and partially cross-sectioned the wave recovery arrangement according to FIG. 6, and FIG. 10 presents in a simplified and diagrammatic way the wave recovery arrangement according to FIG. 6 seen cross-sectioned along the line A-A in FIG. 9.

The third embodiment of the wave energy recovery apparatus according to the invention comprises a reciprocating hinged panel 2 that is substantially similar to the panel 2 presented in FIG. 1. The panel is fitted at its ends with bearings that are in bearing housings 3 located at the ends of the panel 2. The bearing housings 3 are fastened to the base 1. The panel 2 has a downwards opening recess 2b that is almost as wide as the panel 2. The recess 2b makes room for the motionless lower part 19 of the arrangement. Thus, the panel 2 is able to make a reciprocating rotational motion partially around the motionless lower part 19.

The arrangement according to third embodiment of the invention comprises six generators 14 that are fastened to the lower edge of the panel 2 with fastening elements 23. Again, the generators 14 may be more or less than six but, however, always an even number, for example 2, 4, 8, 10, 12 or even more. Preferably, the first half of the generators 14 are fastened to the first side of the panel 2 and the second half of the generators 14 are fastened to the second side of the same panel 2.

Advantageously, all the generators 14 are substantially similar. In addition to characteristic components, each generator 14 comprises a gearwheel 24 of relatively small diameter and a one-way clutch mechanism 10, which both are mounted on the same axle. The one-way clutch mechanism 10 is operatively coupled between the generator axle and the gearwheel 24 axle and is arranged to allow the generator axle to rotate only to one direction, either clockwise or counterclockwise. In addition, the generators 14 on the first side of the panel 2 are in reverse direction compared to the generators 14 on the second side of the panel 2. Thus, when gearwheels 24 of the generators 14 on the first side of the panel 2 are directed towards the second end of the panel 2 the gearwheels 24 of the generators 14 on the second side of the panel 2 are directed towards the first end of the panel 2. In that case, there is more room to arrange the gear assembly. For the sake of clarity only four generators 14 are presented in FIG. 7.

FIG. 8 presents in a side view and in a simplified and diagrammatic way the motionless lower part 19 of the arrangement according to FIG. 6. The lower part 19 comprises a tubular shaft 20 that is supported and fastened to the base 1 with support legs 21. The tubular shaft 20 comprises on its outer circumference a number of motionless gear rims 22, in this case six substantially similar gear rims 22, one for each generator 14. The gear rims 22 are arranged to mesh with the gearwheels 24 of the generators. The gear rims 22 and the gearwheels 24 meshing with each other form a gear transmission 11a for the generators 14 of the third embodiment of the invention.

The diameter of the gear rims 22 is relatively big compared to the diameter of the gearwheels 24. Therefore, the transmission ratio between the gear rim 22 and the gearwheel 24 is relatively great. For example, the transmission ratio is greater than 10, suitably greater than 50 and preferably greater than 100. The greater the transmission ratio the faster the generators 14 rotate when the panel 2 makes its relatively slow reciprocating motion.

FIG. 11-15 present a fourth advantageous embodiment of the wave energy recovery apparatus according to the invention. In FIG. 11 yet another type of an arrangement according to the invention is presented in a side view and in a simplified and diagrammatic way. A protective housing 25 is removed from the first PTO unit 6. FIG. 12 presents in a side view, enlarged, and in a simplified and diagrammatic way the first power take-off unit (PTO) 6 of the wave energy recovery apparatus according to FIG. 11. Whereas FIG. 13 presents in a front view and in a simplified and diagrammatic way the power take-off unit (PTO) 6 of the wave energy recovery apparatus according to FIG. 11. The figure is partially cross-sectioned so that only the tubular shaft 4 of the panel 2 is cross-sectioned. The actual PTO unit 6 is not necessarily cross-sectioned though it has cross-sectional lines. The cross-sectional lines are only presented to make the figure and its components easier to understand and to separate from each other. Correspondingly, FIG. 14 presents in a front view and in a simplified and diagrammatic way a gear rim 26 of the PTO unit 6 of the wave energy recovery apparatus according to FIG. 11, and finally FIG. 15 presents in a front view and in a simplified and diagrammatic way a one-way clutch mechanism 10 of the PTO unit 6 of the wave energy recovery apparatus according to FIG. 11.

The fourth embodiment of the wave energy recovery apparatus according to the invention comprises a reciprocating hinged panel 2 that is substantially like the panel 2 presented in FIGS. 1 and 3. The panel 2 has a hinged tubular shaft 4 that is fastened to the lower edge of the panel 2 and is arranged to rotate along with the panel 2. The tubular shaft 4 is fitted at its ends with bearings that are inside bearing housings 3 located at the ends of the panel 2. The bearing housings 3 are fastened to the base 1. The tubular shaft 4 acts as a pivot shaft for the reciprocating motion of the panel 2.

Preferably, the fourth embodiment of the invention comprises at least two PTO units 6, one at each end of the tubular shaft 4, which ends extend outwards from the bearing housings 3. Each PTO unit 6 comprises a one-way clutch mechanism 10, a gear rim 26 having a toothed outer circumference and a similar group of generators 14 coupled to the gear rim 26 through gearwheels 24 that mesh with the gear rim 26. The gear rim 26 and the gearwheels 24 meshing with each other form a gear transmission 11b for the generators 14 of the fourth embodiment of the invention. Each PTO unit 6 is coupled to the tubular shaft 4 through the one-way clutch mechanism 10 so that the one-way clutch mechanism 10 is operatively connected between the tubular shaft 4 and the inner circumference of the gear rim 26 of the gear transmission 11b.

The gear rim 26 comprises an outer ring 27 with the toothed outer circumference, an inner ring 28 and an elastomer ring 29 between the outer and inner rings. All the rings are coaxial. The purpose of the elastomer ring 29 is to make the movements of the gear rim 26 softer and more flexible. Depending on local sea conditions the elastomer ring 29 may not be needed. In that case, neither the inner ring is needed. However, the gear rim 26 with or without the inner ring 28 is relatively big in its diameter and it is also relatively heavy. The mass is concentrated near the outer circumference of the gear rim 26, which means that the gear rim 26 has a high inertia. Thus, the gear rim 26 has properties of a flywheel and therefore it is arranged to act as a flywheel at the same time when it acts as the gear rim.

The one-way clutch mechanism 10 can be any type of a one-way clutch, preferably the one-way clutch mechanism 10 is a so-called sprag clutch that has an outer ring 30, an inner ring 31 and an active ring 32 between the outer and inner ring. The active ring 32 comprises sprags that allow the rings 30 and 31 to rotate relative to each other into one direction but lock the rotation into the opposite direction.

The one-way clutch mechanism 10 is fastened with its inner ring 31 onto the tubular shaft 4 to rotate along with the tubular shaft 4. The inner ring 31 rotates with the tubular shaft 4 at the same time, to the same direction and at the same speed. The outer ring 30 of the one-way clutch mechanism 10 is fastened to the inner circumference of the inner ring 28 of the gear rim 26 or directly to the inner circumference of the gear rim 26 if the elastomer ring 29 is not used. Thus, the one-way clutch mechanism 10 is arranged to allow the gear rim 26 to rotate only into one direction regardless of the direction of rotation of the tubular shaft 4.

The diameter of the gear rim 26 is relatively big compared to the diameter of the gearwheels 24. Therefore, the transmission ratio between the gear rim 26 and the gearwheels 24 is relatively great. For example, the transmission ratio is greater than 10, suitably greater than 50 and preferably greater than 100. The greater the transmission ratio the faster the generators 14 rotate when the panel 2 makes its relatively slow reciprocating motion.

The arrangement according to fourth embodiment of the invention comprises two PTO units 6 with a group of generators 14 in each PTO unit 6. Now, the generators 14 are presented eight in each PTO unit 6, but again, the generators 14 may be more or less than eight; however, always an even number, for example 2, 4, 6, 10, 12 or even more.

When the rotational movement of the panel 2 and the tubular shaft 4 is towards the first direction, say clockwise, the one-way clutch mechanism 10 of the first PTO unit 6 is in the working mode and the gear rim 26 of the first PTO unit 6 rotates the generators 14 of the first PTO unit 6, whereas the one-way clutch mechanism 10 of the second PTO unit 6 is in the free mode and the gear rim 26 of the second PTO unit 6 neither rotates nor decelerates the generators 14 of the second PTO unit 6 but, however, the rotation of the generators 14 of the second PTO unit 6 continues by the contribution of the flywheel effect of the gear rim 26. And, when the panel 2 goes back and the rotational movement of the panel 2 and the tubular shaft 4 is towards the second direction, say counterclockwise, the one-way clutch mechanism 10 of the first PTO unit 6 is in the free mode and the gear rim 26 of the first PTO unit 6 neither rotates nor decelerates the generators 14 of the first PTO unit 6. But also now, the rotation of the generators 14 of the first PTO unit 6 continues by the contribution of the flywheel effect of the gear rim 26, whereas the one-way clutch mechanism 10 of the second PTO unit 6 is in the working mode and the gear rim 26 of the second PTO unit 6 rotates the generators 14 of the second PTO unit 6.

It is common to all the embodiments of the invention that the arrangement comprises at least two PTO units 6 that each may comprise one or more generators 14. Also, the generators are relatively small in size and arranged to be rotated fast by different types of gear transmissions. For example, when the generators 14 are rotated through a gear transmission the transmission ratio is greater than 10, suitably greater than 50 and preferably greater than 100. The greater the transmission ratio the faster the generators 14 rotate when the panel 2 makes its relatively slow reciprocating motion.

Further in common is that a half of the generators 14 are rotated only to one direction and another half of the generators 14 are rotated only to the opposite direction. In that case, seen from the same direction the first half of the generators 14 are rotated, for example, clockwise and the second half of the generators 14 are rotated counterclockwise, or vice versa. Thus, the first half of the generators 14 are rotated when the panel 2 makes its reciprocating movement to the first direction and the second half of the generators 14 are rotated when the panel 2 makes its reciprocating movement to the second direction that is opposite to the movement of the first direction. This kind of operation is arranged by the use of one-way clutch mechanisms 10 that are placed between the movement of the panel 2 and the rotation of the axles of the generators 14.

It is obvious to the person skilled in the art that the invention is not restricted to the examples described above but that it may be varied within the scope of the claims presented below. Thus, for example, the structure and positions of the PTO unit can be different from what is presented.

The invention claimed is:

1. Wave energy recovery apparatus with a power-take-off arrangement comprising at least a base, a reciprocating panel, two power-take-off (PTO) units with one or more generators to convert kinetic energy of waves or tidal currents to electricity, at least two gear transmissions and at least two one-way clutch mechanisms where the gear transmissions and one-way clutch mechanisms are operatively connected between the panel and the generators, wherein the panel is arranged to rotate a half of the generators when the panel is rotating into one direction and another half of the generators when the panel is rotating into the opposite direction, wherein the apparatus comprises one or more tubular shafts that are fastened to the lower edge of the panel and are arranged to rotate along with the panel, and that each PTO unit is inside the tubular shaft.

2. Wave energy recovery apparatus according to claim 1, wherein the direction of rotation of each generator is controlled with one one-way clutch mechanism.

3. Wave energy recovery apparatus according to claim 1, wherein the one-way clutch mechanism is arranged to allow the generator to have only one direction of rotation.

4. Wave energy recovery apparatus according to claim 1, wherein each gear transmission is equipped with a transmission ratio effecting between the rotational movement of the panel and the rotation axle of the generator, which transmission ratio is greater than 10.

5. Wave energy recovery apparatus according to claim 1, wherein the PTO units are equipped with flywheel properties to maintain the rotation of the axle of the generator when the generator rotating freely.

6. Wave energy recovery apparatus according to claim 1, wherein the PTO unit inside the tubular shaft comprises a one-way clutch mechanism; gear transmission; generator with a rotation axle, rotor and stator; and a flywheel, all coaxial with the rotation axle, and that the one-way clutch mechanism is operatively connected between the tubular shaft and the gear transmission which gear transmission is further operatively connected between the one-way clutch mechanism and the rotation axle of the generator.

7. Wave energy recovery apparatus according to claim 6, wherein the flywheel fastened onto the rotation axle of the generator.

8. Wave energy recovery apparatus according to claim 1, wherein the one-way clutch mechanism is a sprag clutch.

9. Wave energy recovery apparatus according to claim 2, wherein the one-way clutch mechanism is arranged to allow the generator to have only one direction of rotation.

10. Wave energy recovery apparatus according to claim 2, wherein each gear transmission is equipped with a transmission ratio effecting between the rotational movement of the panel and the rotation axle of the generator, which transmission ratio is greater than 10.

11. Wave energy recovery apparatus according to claim 3, wherein each gear transmission is equipped with a transmission ratio effecting between the rotational movement of the panel and the rotation axle of the generator, which transmission ratio is greater than 10.

12. Wave energy recovery apparatus according to claim 2, wherein the PTO units are equipped with flywheel properties to maintain the rotation of the axle of the generator when the generator is rotating freely.

* * * * *